United States Patent Office 3,817,780
Patented June 18, 1974

3,817,780
CELLOPHANE HAVING A SUBSTANTIALLY HAZE-FREE COATING OF THE DRIED RESIDUE FROM AN ORGANIC SOLUTION OF A VINYLIDENE CHLORIDE POLYMER OF NARROW COMPOSITIONAL RANGE
Paul E. Hinkamp, Midland, and Duane F. Foye, Merrill, Mich., assignors to The Dow Chemical Company, Midland, Mich.
No Drawing. Original application Apr. 11, 1972, Ser. No. 243,092. Divided and this application Mar. 2, 1973, Ser. No. 337,726
Int. Cl. C08d 13/16
U.S. Cl. 117—145                               1 Claim

ABSTRACT OF THE DISCLOSURE

This invention is directed to coated articles comprising essentially a cellophane substrate having as a coating on at least one surface thereof a substantially haze-free coating consisting of the dried residue of an organic solution of a vinylidene chloride interpolymer of from about 88 to 93 mole percent vinylidene chloride and about 12 to 7 mole percent of a mixture of acrylonitrile and methyl methacrylate said mixture consisting of a molar ratio of acrylonitrile to methyl methacrylate of from about 1:1 to 4:1, said interpolymer being soluble in a solvent mixture composed of 65 parts by weight tetrahydrofuran and 35 parts by weight toluene at a temperature of from about 25° C. to 46° C.

CROSS-REFERENCE TO RELATED APPLICATION

This is a division of application Ser. No. 243,092, filed Apr. 11, 1972.

The latter application is a continuation-in-part of copending application Ser. No. 85,798, filed Oct. 30, 1970 (now abandoned) which is in turn a continuation-in-part of application Ser. No. 880,389, filed Nov. 26, 1969, now abandoned.

While the homopolymer of vinylidene chloride is generally insoluble at room temperature in conventional organic solvents, e.g., in pure tetrahydrofuran, useful materials, soluble in solvents such as mixtures of toluene and tetrahydrofuran at room temperature, can be made by copolymerization of vinylidene chloride with lesser quantities of other monomers such as acrylonitrile, methacrylonitrile, methyl acrylate (or other $C_2$–$C_{15}$ alcohol esters of acrylic or methacrylic acid, e.g., methyl methacrylate), vinylidene cyanide, acrylic acid, itaconic acid, and chloroacrylonitrile, vinyl chloride, vinyl bromide, vinylidene bromide and the like.

These materials find particular use in the cellophane industry where a very thin (usually 0.05 mil) coating of so-called "soluble" saran is deposited from solvent such as the solvent combinations mentioned above, on one or both sides of cellophane. This thin coating serves several purposes in that it causes the cellophane film to be a good water vapor barrier film for packaging purposes where either a loss of or gain in water content of the product would render the product less attractive for sale. In addition, the coating promotes retention of water (which acts as a plasticizer usually along with some glycol or glycerine) in the cellophane, thus helping to prevent brittle fracture of the film. Finally, such coatings provide a heat sealable outer coating where cellophane, by its very nature, cannot be heat sealed.

For cellophane manufacturers concerned with applying such thin coatings to cellophane, the solubility and water vapor transmission rate (WVTR) are particularly important properties. Usually the desired properties include as low a WVTR as possible coupled with low temperature solubility in inexpensive solvents or solvent combinations. These of course represent only a few criteria; for example, the decision on which resin to use may depend on heat seal temperature, appearance, adhesion to the cellophane, and other factors as well. As a starting point however, WVTR and solubility are of primary importance.

Since the WVTR of saran copolymers is directly related to the mole percent of vinylidene chloride in the copolymer, as the most important factor in the manufacture of such resins, it is advantageous to get the mole percent of vinylidene chloride as high as possible consistent with solubility in the desired workable solvent systems. Since high vinylidene chloride content means strong crystalline forces in the copolymer, these two factors are diametrically opposed, i.e., high vinylidene chloride content, highly crystalline polymers being the least soluble, but offering the lowest WVTR.

As the mole percent of vinylidene chloride is raised in a copolymer series, it is obvious that a percentage range is reached where the polymers rapidly change from ones which are amorphous or offer only slow and incomplete crystallization of the vinylidene portion of the molecule to polymers which crystallize rapidly, are highly crystalline, and are much more difficult to dissolve. It also becomes obvious that in this range of copolymeric composition, a small amount of copolymeric composition drift in the direction of more vinylidene chloride in the copolymer than intended, can result in polymers unsuitable for coating purposes because they do not dissolve completely. The beginnings of such a tendency to become insoluble may be measured by light transmission measurements on the 15 percent lacquer solutions in, for example, 65 percent tetrahydrofuran and 35 percent toluene solvent combinations with an instrument such as the "Spectronic 20." Careful control of the percent light transmission, hereinafter called "haze," is essential to use of these polymers for coating purposes, especially in high mole percent vinylidene chloride copolymers, since the tiny insoluble crystals which cause the haze by incomplete dissolution form nuclei for overall crystal formations once the copolymer has been deposited as a thin coaitng on a substrate. Rate of crystallization is affected by the number of nuclei present; too slow a rate of crystallization is noted in machine operation by blocking tendencies in the coated film which is wound in large rolls long before crystallization is complete.

It is possible by judicious choice of comonomers and proper reaction methods to maximize the WVTR-solubility relationship and approach an ideal composition for use. While much work has been done in the past to find these combinations of comonomers to use for copolymerization, and much effort has also been expended to find the best method of copolymerizing these comonomers to give the best combination of WVTR and solubility, a combination of choice of monomers and method of polymerization thereof has now been discovered which is superior to anything known heretofore for attainment of optimum combined barrier and solubility properties.

The present discovery comprises an improved process for preparing high vinylidene chloride/acrylonitrile/methyl methacrylate interpolymers having an exceptionally narrow compositional range and having enhanced solubility in organic solvents. These interpolymers are prepared by first dissolving in an aqueous emulsion reaction media, (containing emulsifiers and catalyst and optionally a polymerizable, water-insoluble acid such as itaconic acid, acrylic acid or methacrylic acid), acrylonitrile in amount sufficient to satisfy the partition coefficient of such component between the water and oil phases; then maintaining the reaction media at an essentially constant temperature between about 50° C. to 65° C., while adding a second monomer charge in amount between about 3 and 20 weight percent of total monomer wherein such second monomer charge is composed of ratio of monomers sufficient to form an interpolymer of from about 88 to 93 mole percent vinylidene chloride and about 12 to 7 mole percent of a mixture of acrylonitrile with methyl methacrylate in a molar ratio of about 1:1 to 4:1; then maintaining the reaction at a substantially constant temperature between about 50° C. and 65° C. under autogenous pressure, while introducing a substantially continuous feed of the remaining monomer at the termination of the polymerization of the second monomer charge and before a pressure drop of greater than about 2 p.s.i. occurs in the reaction vessel, with the remaining monomers being added in the same ratio as present in the second monomer charge and at a rate of between about 4.5 to 25 percent of total monomer per hour wherein such monomers are immediately polymerized upon introduction to the reaction media; then continuing the polymerization reaction after all monomers have been added until about a 50 percent drop in reaction pressure occurs, and thereafter substantially immediately cooling the reaction and removing unreacted monomer. Such a procedure not only provides the closest known control of copolymeric drift in a batch system but also results in the maximum WVTR and minimum resin solubility when properly carried out.

As previously indicated, the monomeric materials are polymerized in aqueous emulsion by the formation of a seed emulsion, followed by the simultaneous and continuous addition of such materials at a rate at which they are polymerized to form copolymers containing from 88 to 93 mole percent vinylidene chloride and 12 to 7 weight percent of the comonomeric mixture.

Further, since the seed step is essentially a small batch copolymerization in which the composition is likely to drift because of unequal reactivity ratios between monomers it is essential to begin continuous monomer addition as described below as soon as the initial seed step shows any signs of drifting in composition. In reactions of vinylidene chloride this may be noted by observing pressure drop in the free space above such a reaction mixture. If the transition from seed to continuous monomer addition is late, e.g., after more than two pounds pressure drop, enough copolymeric drift may occur to produce insoluble polymer, or at best low haze values, and slow crystallization rates.

It also becomes essential to keep the time at polymerization temperature before the oil phase seed step is begun to a minimum, or again insolubility and incorrect polymeric composition will result from previous, water phase homo- or copolymerization of the monomers in the aqueous phase, such polymer being mixed with the subsequently formed copolymer of carefully controlled compositions.

In this regard, for the majority of the reaction time, after the seed formation step, it is necessary that the mixed monomers be added to the polymerization reaction, in the proper ratios, as fast as they are polymerized and in such a manner that no excess monomer is present at any time in the polymerization media. If the copolymeric composition drifts significantly during the polymerization reaction, insoluble polymer may result or at least a copolymer having a less desirable WVTR-solubility characteristic as evidenced by low "haze" will be produced.

More specifically, it has proven desirable to maintain the reaction temperature between about 50° C. and 65° C. while utilizing a monomer feed rate of between about 4.5 to 25 percent of total monomer per hour, and preferably about 7 percent per hour. Feed rates in excess of about 25 percent per hour result in undesirable viscosity increases or insolubility since monomer excess may accumulate as mentioned before, wherein feed rates of less than about 4.5 percent per hour may give undesirably low viscosities. The reaction is generally conducted under autogenous pressures and after all monomers have been fed, the reaction is terminated upon reaching a 50 percent pressure drop; after which the reaction media is immediately cooled to a temperature of about 25° C. and subjected to reduced pressure to remove remaining monomer and again prevent insolubility or low "Haze" by stopping copolymeric composition drift.

It is emphasized that in the polymerization reaction the addition of monomer after the seed step must be continuous, as contrasted to conventional batch emulsion polymerization techniques in which all monomers are present in toto at the start, to provide polymeric materials having the necessary enhanced solubility in conventionally used organic solvents, i.e., copolymers containing from 88 to 93 mole percent vinylidene chloride made by conventional batch emulsion polymerization techniques, have been found to be insufficiently soluble in conventional coating solvents to provide useful coatings for cellophane and similar substrates.

Conventional emulsion polymerization catalysts, emulsifiers and other additives may be employed in their usual amounts in preparing the high vinylidene chloride polymers of the present invention.

The following examples, wherein all parts and percentages are to be taken by weight, illustrate the present invention, but are not to be construed as limiting its scope.

EXAMPLE 1

The following materials were added to a glass-lined pressure vessel equipped with agitator:

Ingredient:
```
  Water _____ 2640
  Potassium, persulfate (catalyst) _____ 15.1
  Itaconic acid _____ 16.2
  Sodium salt of alkyl sulfate _____ 5.83
  Dihexyl ester of sodium _____ ____
  Sulfosuccinic acid (surface active agent) ____ 28.3
```

The mixture was then deaerated after which 18.5 parts of acrylonitrile was introduced and dissolved in the water phase. The mixture was then rapidly heated to 57° C. at which time the seed portion consisting of 160 parts of a monomer mixture composed of 92.34 parts of vinylidene chloride, 2.65 parts of acrylonitrile and 5.01 parts of methyl methacrylate was immediately introduced in one portion into the polymerization media. The pressure developed by the above monomer addition was noted. The reaction was allowed to proceed until a 2-pound pressure drop indicated that vinylidene vapors were being drawn into the water phase.

At that time addition of the monomer mixture was begun at a rate of 166 parts of monomer mixture per hour until a total of 2160 grams of the monomer mixture had been introduced, after which time the steady state pressure generated by the continuous addition began to fall. When 50 percent of the original pressure remained, the reactor was cooled to 25° C., vented, and then evacuated for 2 hours at 15 inches of water pressure.

The latex so produced represents a polymer yield of over 95 percent and had a particle size of 1300±200 A. average diameter. This latex was colloidally stable during storage at normal room temperatures for over a week and, when coagulated and dried, was soluble at 25° C. in 15 percent concentration in a mixture composed of 65 weight percent tetrahydrofuran and 35 weight percent toluene.

EXAMPLE 2

In each of a series of additional experiments polymer latexes having varying amounts of vinylidene chloride (VeCl$_2$), acrylonitrile (VCN) and methyl methacrylate (MMA) were prepared as described using the technique set forth in Example 1.

Each polymer latex was coagulated and dried and a lacquer mixture prepared by dissolving 15 parts of polymer by weight in 85 parts of a mixture comprising 65 parts of tetrahydrofuran and 35 parts toluene. The resulting clear lacquers were then applied to a cellophane substrate as a coating, being about 0.1 mil in thickness.

The following Table I illustrates the types and amounts of monomers used, the solubility of the so-formed polymer and the water vapor transmission rate of each coating applied to the cellophane substrate.

TABLE I

| Sample number | Mole percent | | | WVTR | 65/35 THF/TOL. solubility |
|---|---|---|---|---|---|
| | VeCl₂ | VCN | MMA | | |
| The invention: | | | | | |
| 1 | 90.0 | 5.0 | 5.0 | 0.23 | At 25° C. |
| 2 | 90.5 | 4.75 | 4.75 | 0.18 | At 25° C. |
| 3 | 91.0 | 4.50 | 4.50 | 0.18 | At 25° C. |
| 4 | 91.5 | 4.25 | 4.25 | 0.16 | At 25° C. |
| 5 | 92.0 | 4.0 | 4.0 | 0.13 | 46° C. |
| 6 | 88.32 | 9.24 | 2.44 | 0.38 | At 25° C. |
| 7 | 89.49 | 8.3 | 2.23 | 0.36 | 30° C. |
| For comparison: | | | | | |
| 8 | 92.0 | | 8.0 | 0.16 | 52° C. |
| 9 | 92.0 | 8.0 | | 0.18 | 58° C. |

The above data illustrate the excellent solubility and WVTR properties of the interpolymers of the present invention.

By way of comparison, polymerization of equivalent molar percentages of the same monomers as described herein (as per sample Nos. 1 through 7 above) but wherein the acrylonitrile was not first added to the reaction media in amount sufficient to satisfy the partition coefficient of the water and subsequent oil phase, produced polymeric materials which were insufficiently soluble in the solvent mixture, even at elevated temperatures, to be successfully applied to a cellophane substrate as a clear, continuous coating.

Further, by way of comparison, polymer latexes having equivalent molar percentages of the same monomers (as designated by sample Nos. 1 through 7) which were prepared as described herein but where such latexes were not cooled and subject to reduced pressures following completion of monomer introduction and reduction in reaction pressure of about 50 percent, were also unexpectedly found to be insufficiently soluble in the solvent mixture to be successfully applied to a cellophane substrate as a clear, continuous coating.

Still further, by way of comparison, polymer latexes which were prepared as described herein but where the pressure drop after the seed formation step was allowed to fall to greater than 2 lbs. from the maximum, exhibited low haze values, and were insufficiently soluble to be successfully applied to a cellophane substrate as a clear, continuous coating.

In addition, by way of comparison, polymer latexes which were prepared as described herein but where the seed step was not begun promptly at reaction temperature on heat-up were unexpectedly low in haze value and insufficiently soluble in the solvent mixtures commonly used for providing cellophane or other coatings with low WVTR.

What is claimed is:

1. A coated product comprising a cellophane substrate having a substantially haze-free coating on at least one surface thereof comprising essentially the dried residue of an organic solution of an interpolymer of from about 88 to 93 mole percent vinylidene chloride and about 12 to 7 mole percent of a mixture of acrylonitrile and methyl methacrylate said mixture consisting of a molar ratio of acrylonitrile to methyl methacrylate of from about 1:1 to 4:1, said interpolymer being soluble in a solvent mixture composed of 65 parts by weight tetrahydrofuran and 35 parts by weight toluene at a temperature of from about 25° C. to 46° C. and said interpolymer being prepared by the sequential steps of (1) dissolving acrylonitrile in an aqueous emulsion media, prior to the addition of vinylidene chloride and methyl methacrylate thereto, in an amount sufficient to satisfy the partition coefficient of said acrylonitrile between the water and subsequent oil phases of said reaction media, (2) heating said reaction media to a temperature of about 50° C., (3) maintaining said reaction media at a substantially constant temperature between about 50° C. to about 65° C. under autogenous pressure while adding a second monomer charge in an amount between about 3 and 20 weight percent of total monomer wherein said second monomer charge is composed of a ratio of monomer sufficient to form an interpolymer of from about 88 to 93 mole percent vinylidene chloride and from about 12 to 7 mole percent of a mixture of acrylonitrile and methacrylate said mixture consisting of a molar ratio of acrylonitrile to methyl methacrylate of from about 1:1 to 4:1, (4) maintaining the reaction at a substantially constant temperature between about 50° C. and 65° C. under autogenous pressure, and at the termination of the polymerization of said second monomer charge but prior to a pressure drop of greater than about 2 p.s.i., adding the remaining monomer in substantially the same ratio as present in said second monomer charge and at a rate of between about 4.5 to 25 percent of total remaining monomer per hour; then upon completion of monomer addition, (5) continuing the polymerization reaction at a temperature of between about 50° C. and about 65° C. under autogenous pressure until about a 50 percent drop in reaction pressure occurs, then (6) substantially immediately cooling the reaction to a temperature below about 50° C. and removing unreacted monomer.

References Cited

UNITED STATES PATENTS

| | | | |
|---|---|---|---|
| 3,235,525 | 3/1966 | Woodard | 260—29.6 |
| 3,251,817 | 5/1966 | Hahn et al. | 260—87.7 |
| 3,310,514 | 3/1967 | Trofimow et al. | 260—29.6 |
| 3,328,330 | 6/1967 | Trofimow et al. | 260—29.6 |
| 3,353,991 | 11/1967 | Shelburg et al. | 117—138.8 |

WILLIAM D. MARTIN, Primary Examiner

M. R. LUSIGNAN, Assistant Examiner

U.S. Cl. X.R.

117—161 UC, 161 UF; 260—80.81